United States Patent [19]

Dziurla et al.

[11] Patent Number: 5,093,035

[45] Date of Patent: * Mar. 3, 1992

[54] CONDUCTIVE POLYARYLENESULPHIDE MIXTURES CONTAINING CARBON

[75] Inventors: Heinz-Jürgen Dziurla; Klaus Kraft, both of Leverkusen; Klaus Reinking, Wermelskirchen; Wolfgang Wehnert, Krefeld, all of Fed. Rep. of Germany

[73] Assignee: Bayer Aktiengesellschaft, Fed. Rep. of Germany

[*] Notice: The portion of the term of this patent subsequent to Jan. 15, 2008 has been disclaimed.

[21] Appl. No.: 306,672

[22] Filed: Feb. 6, 1989

[30] Foreign Application Priority Data

Feb. 13, 1988 [DE] Fed. Rep. of Germany ....... 3804535
Mar. 2, 1988 [DE] Fed. Rep. of Germany ....... 3806664

[51] Int. Cl.$^5$ .............................................. H01B 1/06
[52] U.S. Cl. .................................. 252/511; 524/449; 524/495; 524/496; 524/609; 252/506
[58] Field of Search ................. 252/511; 524/495, 496, 524/609

[56] References Cited

U.S. PATENT DOCUMENTS

| | | |
|---|---|---|
| 3,521,214 | 7/1970 | Bennett et al. |
| 4,690,778 | 9/1987 | Narumiya et al. ................. 524/495 |
| 4,698,179 | 10/1987 | Suzuki et al. |
| 4,985,175 | 1/1991 | Dziurla et al. ..................... 524/504 |

FOREIGN PATENT DOCUMENTS

| | | |
|---|---|---|
| 297888 | 1/1989 | European Pat. Off. |
| 332121 | 3/1989 | European Pat. Off. |
| 351660 | 7/1989 | European Pat. Off. |
| 355615 | 2/1990 | European Pat. Off. |
| 183750 | 10/1983 | Japan . |
| 154460 | 9/1984 | Japan . |
| 53560 | 7/1985 | Japan . |
| 169859 | 7/1987 | Japan . |
| 81450 | 9/1987 | Japan . |
| 172059 | 1/1988 | Japan . |
| 14275 | 1/1989 | Japan . |
| 1548045 | 7/1979 | United Kingdom . |

OTHER PUBLICATIONS

Chemical Patents Index Basic Abstracts Journal, Derwent Publications Limited, AN=87-25456/36, & JP A 62172059 (1987).

Primary Examiner—Joseph L. Schofer
Assistant Examiner—Mark D. Sweet
Attorney, Agent, or Firm—Connolly & Hutz

[57] ABSTRACT

The invention relates to conductive blends made from polyarylenesulphides, preferably polyphenylenesulphides (PPS) with graphite and conductive carbon black.

5 Claims, No Drawings

CONDUCTIVE POLYARYLENESULPHIDE MIXTURES CONTAINING CARBON

The invention relates to conductive blends made from polyarylenesulphides, preferably polyphenylenesulphides (PPS) with graphite and conductive carbon black.

Polyarylenesulphides and their production have been disclosed, e.g. U.S. Pat. No. 2,354,129, EP-OS 171,021.

Polyarylenesulphides with fillers, e.g. blended with conductive carbon black, have also been disclosed (e.g. U.S. Pat. No. 3,354,129, JP-OS 161,960).

According to the content of these publications blends of polyarylenesulphides with conductive carbon black are remarkable for having low electrical resistances. Thus, it has been possible to measure values of $10^3$ ohm and $10^2$ ohm cm for the specific surface resistance and the specific volume resistance of injection mouldings. However the reduced electrical resistances obtained in this way are not always satisfactory for a range of technical applications.

A further disadvantage of blends of this type, is that mould release agents must be added to produce injection mouldings from these blends. Using these mould release agents it is possible to remove especially thin-walled or complex mouldings from the mould and to achieve a surface quality which is acceptable for the subsequent application.

The mechanical properties, as for example tensile and flexural strength, toughness and outer fibre strain can be adversely affected, however, by the addition of mould release agents.

Therefore it is hardly possible in this way to achieve the technical object of producing blends having electrical resistances of typically less than 50 ohm in the moulded component while at the same time having good mechanical properties, good mould release characteristics and a good surface.

It has now been found that in blends of polyarylenesulphides with carbon at the same total concentration of carbon, significantly lower electrical resistances are achieved, if a mixture of conductive carbon black and graphite is used as carbon.

Object of the invention are blends made from
a) 20 to 92% by weight polyarylenesulphides, preferably PPS,
b) 4 to 60% by weight conductive carbon black and
c) 4 to 60% by weight graphite
where the sum of the proportions by weight of individual components a)+b)+c) is in every case 100% by weight, and containing as required 0.01 to 150% by weight of other customary fillers and additives, based on the weight of the sum of the components a+b+c.

The specific surface resistance and specific volume resistance of injection mouldings made from mixtures according to the invention are less than 50 ohm and 5 ohm.cm respectively.

A further advantage of blends according to the invention is that none of the customary, for example waxy, mould release agents must be added to produce injection mouldings from these blends. Mouldings from these blends are thus remarkable for having a higher level of mechanical properties.

A further advantage of blends according to the invention is that the electrical resistances are not affected by the migration of volatile mould release agents. Further blending with nonconductive polyarylenesulphide blends is also possible.

Polyarylenesulphides within the scope of the invention include for example linear and branched polycondensates which are obtainable by reacting dihalogenated aromatic compounds, particularly for example p-dichlorobenzene with sulphur donors (e.g. U.S. Pat. No. 3,354,129, EP-OS 171,021).

Suitable carbon blacks according to the invention are gas blacks, furnace blacks or flame blacks with average diameters of primary particles in the range 5 to 200 nanometer (nm), preferably in the range 10 to 100 nm and in particular in the range 15 to 50 nanometer.

The BET surface areas of suitable carbon blacks according to the invention are greater than 20 $m^2/g$. Their dibutylphthalate (DBP) adsorption is greater than 40 ml/100 g carbon black.

They have an average primary particle diameter in the range 5 to 50 nm.

Suitable carbon blacks according to the invention are for example customary commercial conductive carbon blacks as for example Cabot Black Pearl 2000 ®, Cabot Vulcan XC 72 ® and 72 ®, Cabot Vulcan P ®, Phillips XE 2 ®, Ketjan Black EC 600 ® and so on.

Suitable graphites according to the invention are graphite powders, graphite fibres or graphite dusts, which for example are customary in the trade as electrode graphite in a wide range of particle types with particle diameters up to 5 mm. Graphite powders which are preferably used have average particle sizes (diameters) up to 1 mm, preferably up to 0.5 mm.

The production of blends according to the invention from polyarylenesulphides, carbon black and graphite and if necessary other fillers and reinforcing materials can be carried out by customary compounding processes on single screw or multiple screw extruders, e.g. ZSK machines or suitable kneaders, e.g. BUSS KO-Kneaders, preferably on machines with devolatilization equipment or by suitable agglomeration processes, e.g. Pallmann agglomerators d/or Condux agglomerators.

Moreover, it is possible to produce these blends using powder technology (powder mixes from the individual components - metered or mixed together).

Powder mixes can be produced e.g. on conical screw mixers, tumble mixers, turbine mixers, gyro-wheel mixers or similar mixers.

In order to improve certain properties, addition can be made to blends according to the invention of 0.01 to 150% by weight of other customary fillers or reinforcing materials, for example aramide fibres, glass fibres or other inorganic compounds such as talc, quartz, mica, chalk, pigments and so on, which can be pretreated as necessary in the customary manner, or mixtures of these. Stabilizers can also be added to improve certain properties.

The blends according to the invention can be processed to moulded components, intermediate components, sheet or fibres. The electrical resistances of mixtures can be adjusted for example by further blending with nonconductive polyarylenesulpide blends. The mouldings thus obtained can exhibit desirable properties depending upon the electrical resistances which have been adjusted and, can be used e.g. as a shield from electromagnetic waves or to convert the electric current introduced into heat (heating applications).

EXAMPLES

Polyphenylenesulphide produced according to

| | |
|---|---|
| EP-OS 171,021 | 40.0% by weight |
| Conductive carbon black Cabot Vulcan XC 72 ® | 20.0% by weight |
| Graphite (supplier, Merck) | 10.0% by weight |
| Glasfibre | 30.0% by weight |

The starting materials as described were metered into a twin screw extruder with devolatilization equipment.

The temperature during compounding was in the range of 320° to 360° C.

Downstream of the compounding cutter, a cylindrical granules was obtained, which was processed into the relevant mouldings from which the following mechanical and electrical characteristics were obtained:

Electrical characteristics

| | |
|---|---|
| Specific surface resistance (in accordance with DIN 53 596, VDE 0303 part 3, potential method) | 49.0 ohm |
| Specific volume resistance (in accordance with DIN 53 596, VDE 0303 part 3, potential method) | 0,75 ohm · cm |

Mechanical characteristics

| | |
|---|---|
| Flexural strength (DIN 53 452, ISO/R 178) | 165 N/mm$^2$ |
| Outer fibre strain under maximum load | 1,2% |
| Flexural modulus E (DIN 53 457) | 13,000 N/mm$^2$ |
| Impact strength (ISO/R 180) | 18 kJ/m$^2$ |

EXAMPLE 2

Recipe

| | |
|---|---|
| Polyphenylenesulphide according to Example 1 | 47.5% by weight |
| Conductive carbon black Cabot Vulcan XC 72 ® | 10.0% by weight |
| Graphite (supplier, Merck) | 5.0% by weight |
| Glass fibres | 22.5% by weight |
| Mica | 15.0% by weight |

The given starting materials are compounded as described in Example 1.

The mouldings produced from this blend have the following

Electrical characteristics

| | |
|---|---|
| Specific surface resistance (in accordance with DIN 53 596, VDE 0303 part 3, potential measurement procedure) | 9.1 × 10$^4$ ohm |
| Specific volume resistance (in accordance with DIN 53 596, VDE 0303 part 3, potential measurement procedure) | |

EXAMPLE 3

The compound produced in Example 1 was mixed with a separately produced compound made from 55% by weight PPS and 45% by weight glass fibres, in the ration of 1:2 and processed into mouldings. The mouldings had the following composition:

| | |
|---|---|
| Polyphenylenesulphide | 49.0% by weight |
| Conductive carbon black Cabot Vulcan XC 72 ® | 8.0% by weight |
| Graphite (supplier, Merck) | 4.0% by weight |
| Glass fibres | 27.0% by weight |
| Mica | 12.0% by weight |

Subsequently, a specific surface resistance of 10$^8$ ohm was obtained from mouldings (in accordance with DIN 53 596, VDE 0303 part 3, resistance between the plugs).

We claim:

1. Conductive blends made from
   a) 20 to 92% by weight polyarylenesulphides,
   b) 4 to 60% by weight conductive carbon black and
   c) 4 to 60% by weight graphite,
where the sum of the percentages by weight of the components a)+b)+c) is in every case 100% by weight and containing 0.01 to 150% by weight of glass fibers, based on the weight of the sum of the components a+b+c.

2. Mixtures according to claim 1, characterized in that polyphenylenesulphide is used as the polyarylenesulphides.

3. Mixtures according to claim 1, characterized in that the products produced from them have specific surface resistances less than 50 ohm.cm and specific volume resistances less than 5 ohm.cm.

4. Mixtures according to claim 1, characterized in that the mouldings produced from them have an electrical conductivity which reaches 0.125 Sm/mm$^2$.

5. Mixtures according to claim 1 which additionally contain mica as a filler.

* * * * *